(12) United States Patent
Ben-Shalom et al.

(10) Patent No.: US 7,804,054 B2
(45) Date of Patent: Sep. 28, 2010

(54) WIRELESS SYSTEM AND METHOD FOR DISPLAYING THE PATH TRAVELED BY A MARKER

(75) Inventors: Amir Ben-Shalom, Modiin (IL); Oola Greenwald, Mevasseret Zion (IL); Michael Morris, Modiin (IL); Arik Rofe, Jerusalem (IL)

(73) Assignee: Powermat Ltd., Neve Ilan (IL)

( * ) Notice: Subject to any disclaimer, the term of this patent is extended or adjusted under 35 U.S.C. 154(b) by 0 days.

(21) Appl. No.: 12/151,105

(22) Filed: May 2, 2008

(65) Prior Publication Data

US 2008/0272316 A1  Nov. 6, 2008

Related U.S. Application Data

(60) Provisional application No. 60/924,217, filed on May 3, 2007.

(51) Int. Cl.
*G21G 5/00* (2006.01)
(52) U.S. Cl. .............................. 250/227.13; 250/492.1
(58) Field of Classification Search ............ 250/227.13, 250/492.1
See application file for complete search history.

(56) References Cited

U.S. PATENT DOCUMENTS 6,436,299 B1 * 8/2002 Baarman et al. ......... 250/492.1

* cited by examiner

*Primary Examiner*—Seung C Sohn
(74) *Attorney, Agent, or Firm*—Browdy and Neimark, PLLC

(57) ABSTRACT

A low maintenance path tracing apparatus comprising at least one marker including an emitter of a tracer signal and a receiving medium for recording the path of the tracer signal. The apparatus further includes a power providing arrangement comprising a base unit which wirelessly provides power to the marker for powering the emitter.

15 Claims, 6 Drawing Sheets

WIRELESS SYSTEM AND METHOD FOR DISPLAYING THE PATH TRAVELED BY A MARKER

PRIORITY INFORMATION

The present invention claims priority to U.S. Provisional Patent Application No. 60/924,217 filed on May 3, 2007.

FIELD OF THE INVENTION

The present invention generally relates to the field of path tracing display apparatus. More specifically the invention relates to path tracing apparatus having low maintenance requirements.

BACKGROUND OF THE INVENTION

It is often necessary to record the trajectory of a marker within a defined area. Such a record is useful for example in scientific experiments or demonstrations such as for recording the path of a pendulum, or the locus of a moving point, for example.

Known methods for tracing the path of a marker include using paint brushes, drippers, crayons, writing implements and the like that mark some receiving medium such as paper, for example. In a first generic path tracing system, a tracing material such as a pigment, ink, dye or such like is carried by the marker and is deposited upon the receiving medium as the marker passes over it. The ink in a pen, the paint upon a paintbrush, the graphite core of a pencil, or the body of a wax crayon are examples of tracing materials that can be used to trace a trajectory. It will be appreciated that in all these systems, a path is traceable only as long as tracing material is available. When the tracing material runs out, it must be replaced or the marker must be refilled in order to continue tracing the path.

Moreover, a receiving medium such as paper is typically permanently marked by the marker and is not easily reused, and in order to trace multiple paths, paper must be replaced. Where a permanent record of the path is not required, discarding used paper is both costly and wasteful.

In a second generic tracing system, the tracing material is carried by the receiving medium, such as, for example a panel constructed from phosphorescent material. Phosphorescent material fluoresces after illumination and a marker carrying a light source moving over such a panel leaves a fluorescent trace marking its path which fades over time. Although in this case the marker does not carry the tracing material, a path is only traceable as long as the light source is active, thus the marker must be connected to a power source. However, wires or leads physically connecting the marker to a power source are inconvenient as they can become tangled, untidy and may limit the movement of the marker. An internal power source, such as batteries, may be used to provide the marker with the required power without limiting the freedom of movement of the marker. However the internal power supply itself eventually needs replacement.

Where continuous or repeated use of a path tracing apparatus is needed over long time periods, systems which require consumerables, such as paper, power sources and/or tracing materials, to be replenished may be impractical. In such situations, systems without ongoing maintenance requirements would present a significant advantage.

There is a need for a maintenance free path tracing apparatus and method therewith for recording the path of a marker, and the present invention addresses this need.

SUMMARY OF THE INVENTION

It is one object of the present invention to disclose a tracing apparatus comprising at least one wireless electromagnetic emitter configured to provide a tracer signal; at least one receiving medium constructed from a photosensitive material sensitive to the emitted radiation and configured to record the path of said tracer signal and at least one power providing arrangement. The invention is characterized by the power providing arrangement comprising at least one base unit connected to a power source and configured to wirelessly transmit power to at least one mobile power unit carried by the marker and adapted to receive the power transmitted by the base unit and to thereby provide power to the source of electromagnetic radiation.

According to various embodiments of the current invention, the electromagnetic emitter is adapted to provide a tracing signal in the radio, ultra-violet or infra-red regions of the spectrum. However in preferred embodiments a light source provides a tracing signal in the visible light region. Any of the above forms of electromagnetic radiation can be provided by appropriate light emitting diodes (LEDs) as known. Alternatively laser light sources, incandescent light sources, gas-discharge light sources or directed sunlight can be used to provide the electromagnetic radiation source which is directed from the marker. In a further embodiment of the invention, a heat source is used to provide a tracing signal in the far infra-red region.

It is also noted that additional units such as lens arrangements, mirrors, beam shapers or filters can be incorporated into the marker unit to provide the tracing signal with a predetermined shape.

According to various embodiments of the invention, the receiving medium comprises a surface coated with a photochromic material. Suitable photochromic materials include triarylmethanes, stilbenes, azastilbenes, nitrones, fulgides, spiropyrans, naphthopyrans, spiro-oxazines, combinations thereof and other materials the colour of which undergoes a change upon illumination from a light source. In further embodiments the surface is coated with photoluminescent material such as zinc sulfide or strontium oxide aluminate based pigments configured to absorb energy from the tracing signal and to reemit the energy as light over an extended time period. Other embodiments may use thermochromic materials, polarizing materials, or other materials whose visual appearance changes in response to the tracing signal.

In a similar manner the receiving medium might comprise a matrix of photosensitive electronic components such as inter alia, photodiodes or photovoltaic cells to record the trace. This is advantageous in that the signal can be stored electronically and displayed by some interface such as a visual display unit (VDU) for viewing or even transmitted to a printer.

Regarding the power providing arrangement, according to a first embodiment, the base unit comprises a primary coil of wire connected to an alternating electric power supply, such as the mains power, and the mobile power unit comprises a secondary coil of wire connected to a light emitting diode. According to this first embodiment, power is transmitted to the mobile power unit by means of electromagnetic induction, the base unit and mobile power unit in combination effectively forming an air core transformer.

In a second embodiment of the power providing arrangement, the base unit comprises a radio transmitter configured to transmit high energy radio waves. According to the second embodiment the mobile unit comprises an antenna tuned to the frequency of the radio transmitter in the base unit and connected to a light emitting diode (LED). It is noted that the radio waves may be directed towards the mobile power unit and their frequency may be selected such that the electrical energy is transferred specifically to the base unit.

In a further embodiment of the power providing arrangement, the base unit comprises a light source directed towards the mobile power unit wherein a photovoltaic cell converts the light energy into electrical energy used to power a LED. In yet another embodiment the base unit transmits high energy ultrasonic waves which are detected by a piezoelectric device in the mobile power unit. The above examples are to be understood as non-limiting examples of a power providing arrangement which is characterised by its ability to provide wireless power transmission from a base unit to a remote mobile unit.

It is noted that some embodiments are directed to tracing a trajectory in a frictionless manner, for example for use in presentations such as scientific demonstrations, experiments, mechanical diagnosis and the like.

Other embodiments are directed to providing writing or otherwise marking within a defined area. This can be achieved for example by providing a base unit which provides power only to a limited region.

A first aspect of the invention is directed to presenting a tracing apparatus comprising: at least one remote marker comprising an emitter for emitting a tracer signal; at least one receiving medium for recording the path of the tracer signal; and at least one power providing arrangement comprising a base unit for wirelessly providing power to the remote marker.

Typically, the emitter is configured to emit electromagnetic radiation. Optionally the electromagnetic emitter emits radiation in at least one of the regions selected from the group comprising: the visible light region, the infrared region, the ultraviolet region and the radio wave region.

Preferably said receiving medium comprises a photosensitive material sensitive to the selected radiation.

Typically said photosensitive material is selected from the group comprising: photochromic materials, photoluminescent materials, phosphorescent materials, thermochromic materials and polarising materials.

Alternatively the photosensitive material comprises a matrix of photosensitive electronic components selected from the group comprising: photodiodes, photovoltaic cells, photodetectors, photomultipliers and photoconductors.

Preferably the base unit of the power providing arrangement comprises a primary inductive coil and the remote marker comprises a secondary inductive coil configured to couple inductively with said primary inductive coil.

Optionally the base unit of the power providing arrangement comprises a light source and the remote marker comprises at least one photovoltaic cell.

Alternatively the base unit of the power providing arrangement comprises a high energy radio transmitter and the remote marker comprises an antenna tuned to receive a signal from the high energy radio transmitter.

Optionally the base unit of the power providing arrangement comprises a high energy ultrasonic transmitter and the remote marker comprises a piezoelectric device for receiving a signal from the high energy ultrasonic transmitter.

Optionally the tracing apparatus is incorporated into a device for providing a demonstration in a science center. Alternatively or additionally the apparatus is incorporated into a toy. Optionally, the apparatus is incorporated into a writing apparatus.

A second aspect of the current invention is directed to a method for tracing the trajectory of a remote marker comprising:
providing a base unit for wirelessly providing power to said remote marker;
providing power to said remote marker;
emitting a tracer signal from said remote marker;
providing at least one receiving medium configured to receive said tracer signal and to record the position at which said tracer signal is received; and
recording the path of said tracer signal.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DETAILED DESCRIPTION OF THE EMBODIMENTS

The following description is provided, so as to enable a person skilled in the art to make use of the invention and sets forth the best modes of carrying out this invention contemplated by the inventor. Various modifications, however, will remain apparent to those skilled in the art, since the generic principles of the present invention have been defined specifically to provide a low maintenance path tracing apparatus.

Figure 1A:
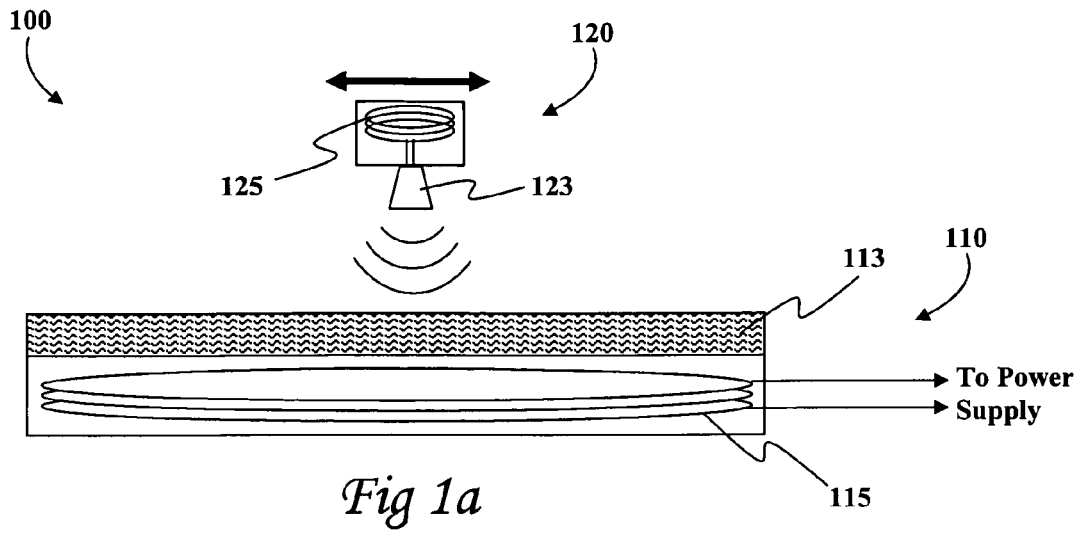
FIGS. 1a and 1b schematically represent a tracing apparatus according to a first embodiment of the invention.
Figure 1B:
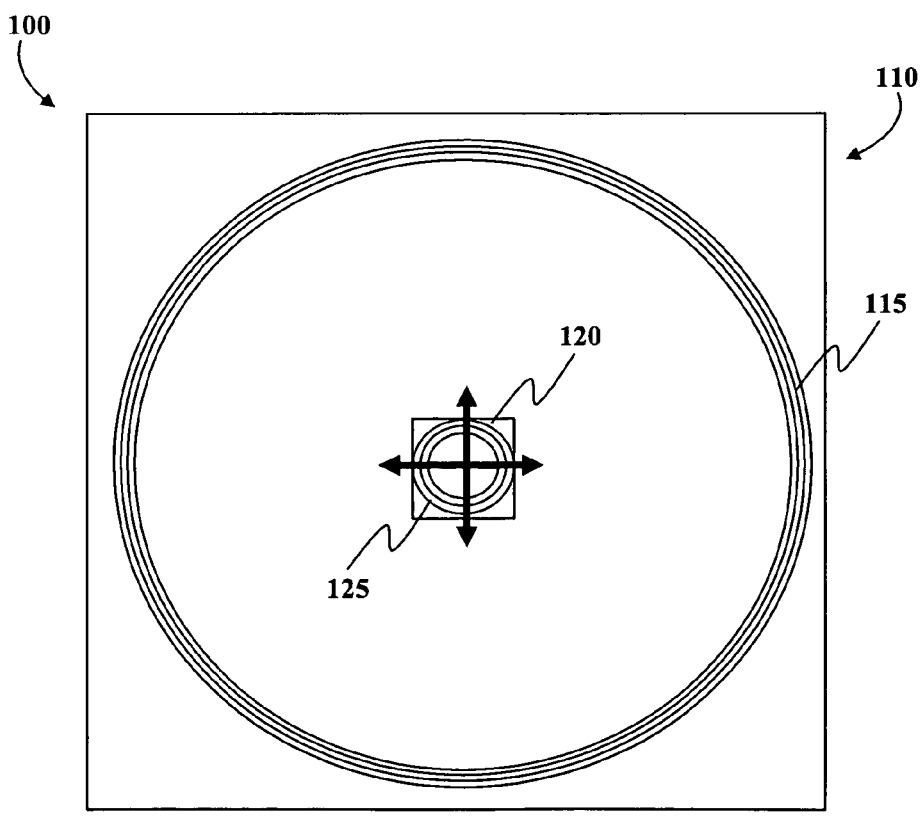

Reference is now made to FIGS. 1a and 1b, which represent a side view and a top view of a tracing apparatus 100 according to one embodiment of the invention. The tracing apparatus 100 includes mobile marker unit 120 and a base unit 110. The mobile marker unit 120 is free to move over the base unit 110 (as indicated by arrows in FIGS. 1a and 1b) and the base unit 110 is configured to record the path is of the mobile marker unit 120 as it moves.

It is a particular feature of the invention that the base unit 110 includes a receiving medium 113, such as a photosensitive material or the like, which is sensitive to a particular type of radiation. The mobile marker unit 120 includes an emitter 123, such as a light emitting diode or the like, selected to emit a tracer signal of the same radiation type. Consequently, when the tracing signal emitted by the marker unit 120 is received by the receiving medium 113, the position at which the tracing signal is received is recorded. As the mobile marker 120 moves relative to the base unit 100 the trajectory of the marker 120 is recorded. It is noted that by selecting a reversible photosensitive material whose appearance returns to its original state after a time delay, for example within 30 seconds, it is possible to provide a self erasing temporary trace of the trajectory.

According the first embodiment of the invention, power is provided to the emitter 123 via electromagnetic induction. The base unit 110 incorporates a primary inductive coil 115 which is connected to a power source, preferably via a driver (not shown). The driver may provide the electronics necessary to drive the primary coil 115. Driving electronics provides a high frequency oscillating voltage supply.

The mobile marker unit 120 further includes a secondary inductive coil 125 wired to the emitter 123. The secondary inductive coil 125 is configured to receive power via electromagnetic induction when it is within range of the primary inductive coil 115 of the base unit 110. It will be appreciated that no additional power source is typically required to power the emitter.

Figure 6A:
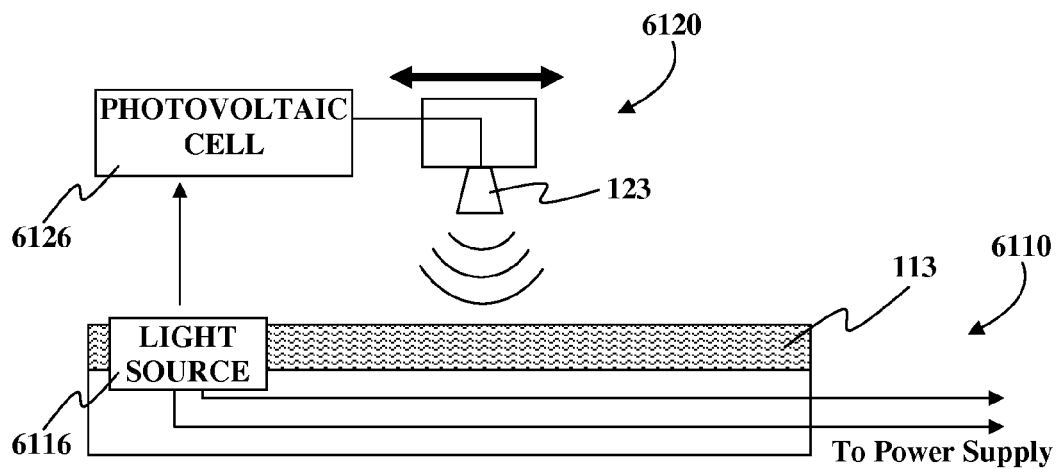
FIGS. 6a-c schematically represent other embodiments of the tracing apparatus.
Figure 6B:
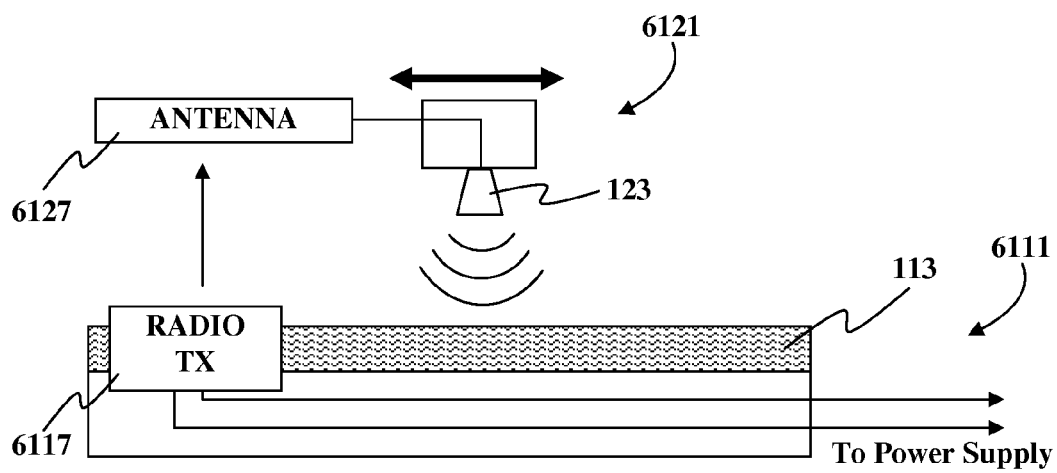
Figure 6C:
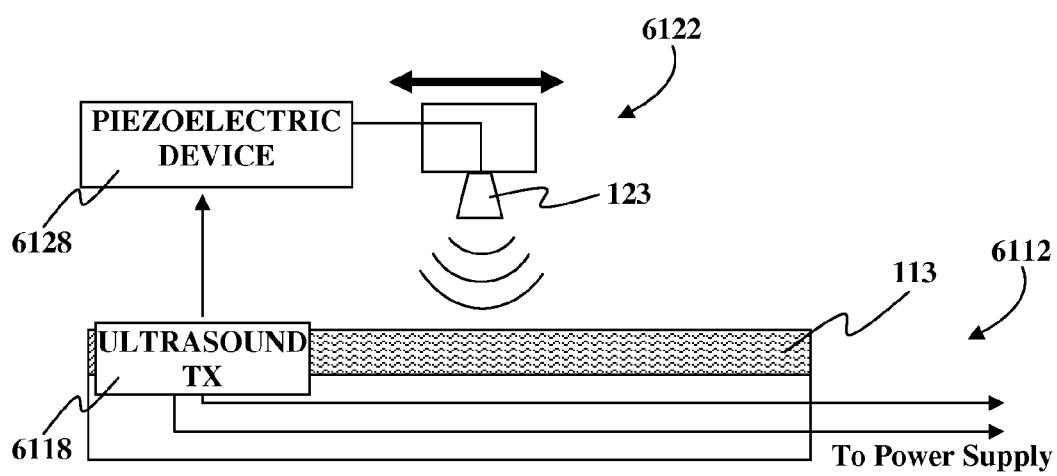

Although an inductively powered tracing device is described hereabove, it will be appreciated that alternative wireless power transfer may be used. For example:

referring to FIG. 6a, a light source 6116 in the base unit 6110 may provide power to a remote photovoltaic cell 6126 in the marker 6120, referring to FIG. 6b, a high energy radio transmitter 6117 in the base unit 6111 may provide power to an antenna 6127 in the marker 6121 tuned to receive a signal from said high energy radio transmitter 6117, and referring to FIG. 6c, a high energy ultrasonic transmitter 6118 in the base 6112 may provide power to a remote piezoelectric device 6128 in the marker 6122.

Figure 2:
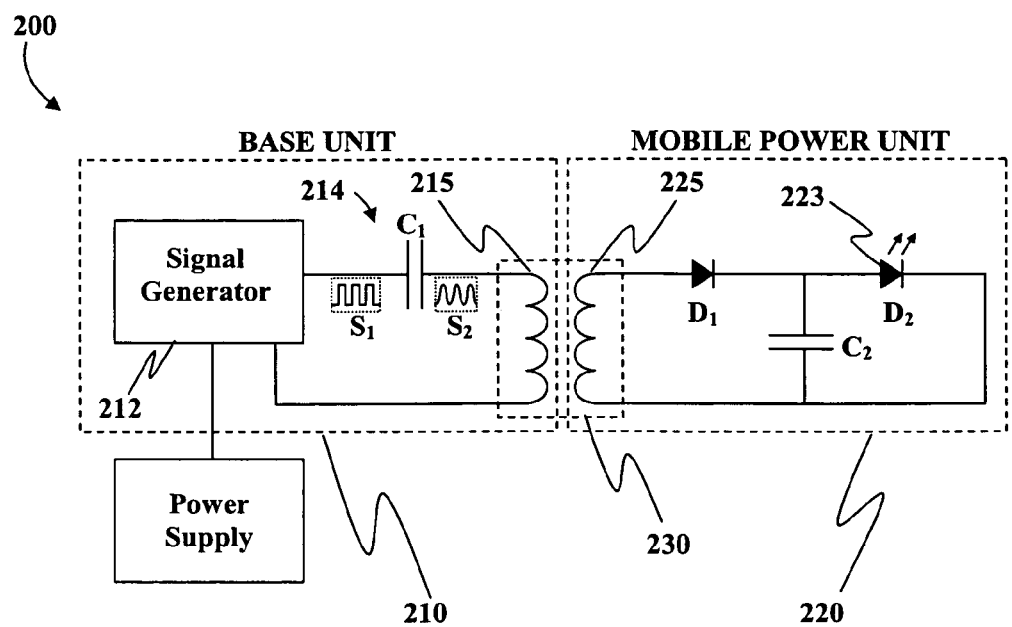
FIG. 2 is a schematic electronic diagram showing the configuration of an electromagnetic induction based power providing apparatus according to a second embodiment of the current invention.

Referring now to FIG. 2, showing an exemplary circuit diagram of an inductive power providing arrangement 200 for transferring energy from a base unit 210 to a separate mobile power unit 220 according to a second embodiment of the invention.

The base unit 210 includes a signal generator 212, a circuit 214 and a primary inductive coil 215. The signal generator 212 is wired to a power supply and configured and operable to provide a high frequency pulsed signal $S_1$. According to one embodiment, the high frequency signal is within the range of about 30 kHz to 300 kHz. However, other frequencies may be effectively utilized. The circuit 214 includes a capacitor $C_1$ which converts the pulsed signal $S_1$ into a high frequency oscillating signal $S_2$ which drives the primary coil 215.

The mobile power unit 220 is not mechanically connected to the base unit 210. The mobile power unit 220 includes a secondary coil 225, a smoothing capacitor $C_2$ and a light emitting diode 223. The primary coil 215 and the secondary coil 225 effectively form an air-core transformer 230 and the power is transferred from the primary coil 215 to the secondary coil 225 by electromagnetic induction. The smoothing capacitor $C_2$ provides a smoothed direct current signal to the light emitting diode 223.

Alternative electrical configurations for transferring power inductively incorporating for example a flyback transformer, a flyback converter, a full-bridge converter, a half-bridge converter, a forward converter or the like will be apparent to the skilled practitioner. In addition, although an air-core transformer may be preferred for certain embodiments, ferrite cores may be added to either the base unit 210, the mobile power unit 220 or both so as to improve inductive coupling.

Figure 3:
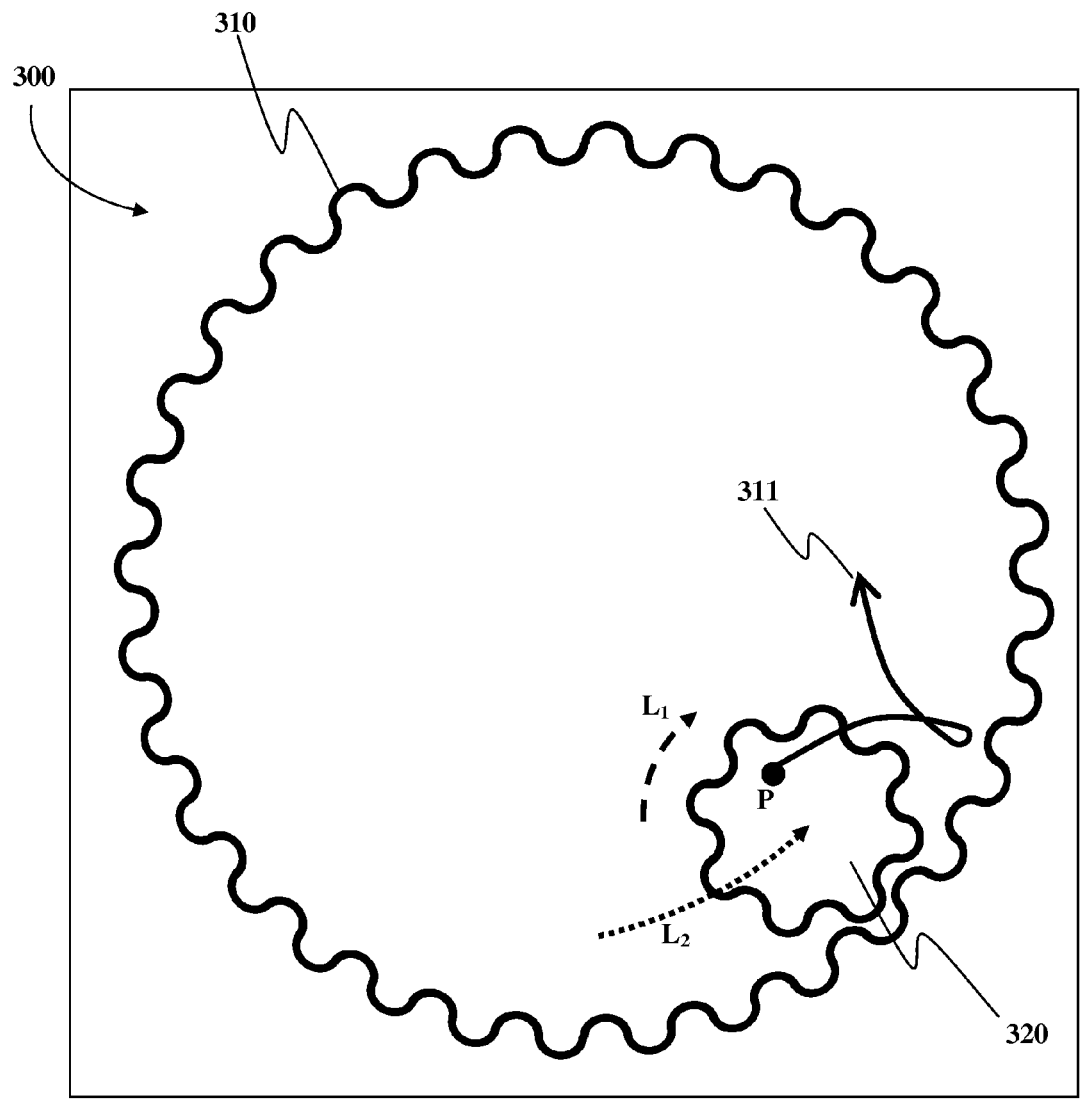
FIG. 3 is a schematic representation of an exemplary apparatus used to trace the trajectory of a point P as used in scientific demonstrations for example in an interactive science center.

Reference is now made to FIG. 3 which shows an exemplary apparatus used to trace the trajectory of a point P. The apparatus shown may, for example be used in scientific demonstrations, such as in an interactive science center. An epicyclical gear system 300 comprises a planetary gear 320 which is free to rotate around an annular gear 310. When the planetary gear 320 rotates about its axis as indicated by line $L_1$, whilst remaining in contact with the annular gear 310, its axis traces the line $L_2$. A point, P, fixed somewhere upon the planetary gear 320, follows a locus 311 which depends upon, amongst other things, its distance from the axis. In interactive science centers it can be desirable to demonstrate such a trajectory in an exhibit designed for use by an untrained visitor.

Interactive science centers often provide exhibits such as this, which require relatively complicated trajectories to be recorded. Other examples include tracing the path of a pendulum, recording paths through a maze or the trajectory of a projectile. There are number of problems associated with existing ways of recording such trajectories in science centers. Recording apparatus using consumerables such as pens or paper require replacing regularly and, particularly when used by untrained visitors, lead to waste, mess and high maintenance costs. In addition it is not easy to clear a previous path before tracing a new one. Moreover, pens and the like may be used to mark other surfaces and graffiti the walls of the science center for example.

Figure 4:
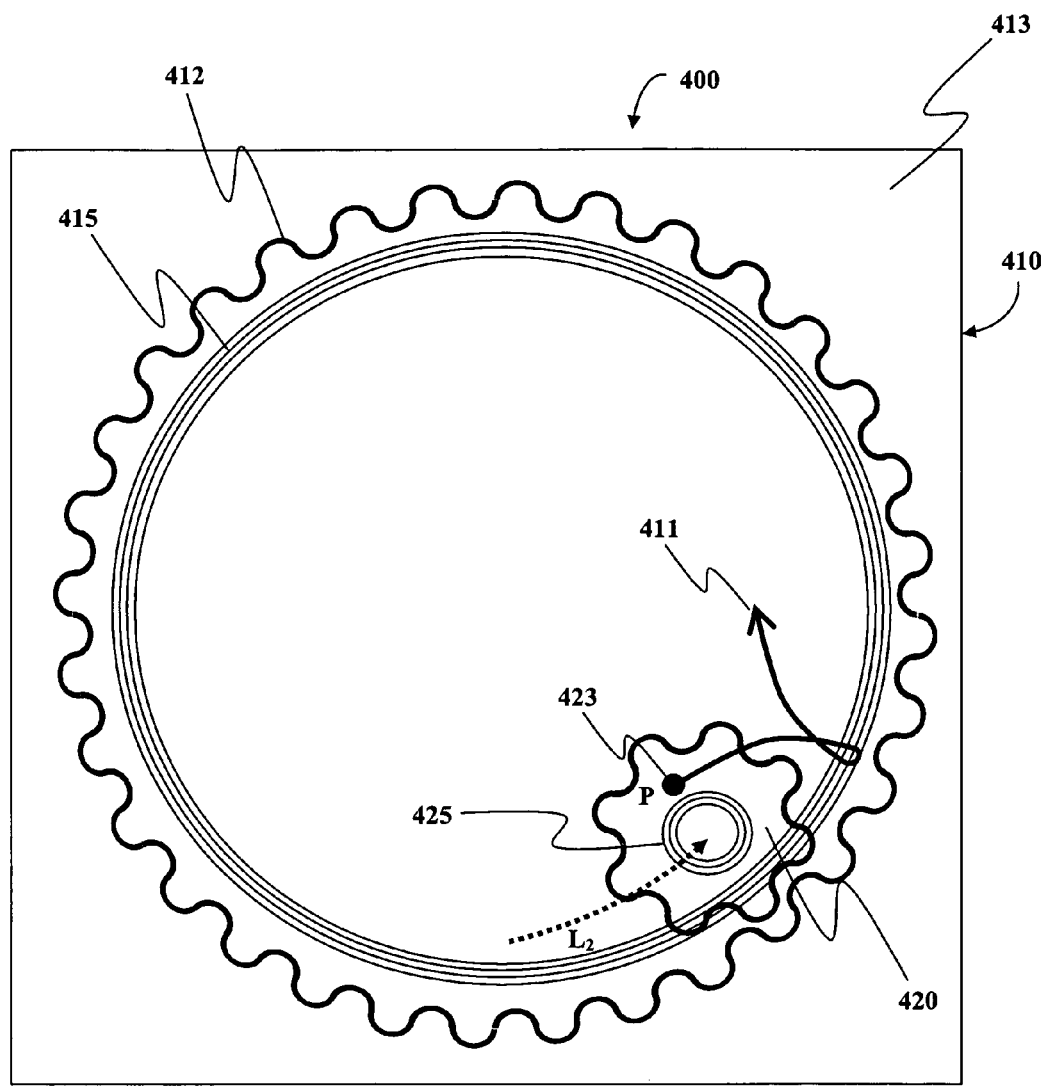
FIG. 4 is a schematic representation shows a third embodiment of the current invention incorporated into the apparatus of FIG. 3.

FIG. 4 shows a tracing apparatus 400 according to a third embodiment of the invention for tracing the trajectory of FIG. 3 in a maintenance free manner. A primary coil 415 is embedded into a base unit 410 beneath the annular gear 412. The planetary gear 420 carries a secondary coil 425 which, when inductively coupled to the primary coil 415, serves as a mobile power unit 220 (FIG. 2), providing power to a LED 423 placed at point P.

The LED 423 is configured to emit a tracing signal toward a photosensitive receiving medium 413 coating the base unit 420. As the planetary gear 420 rolls around the annular gear 412, the trajectory 411 of the tracing signal is marked out along the receiving medium 413.

Moreover, particular photosensitive materials such as photochromic materials, photoluminescent materials, phosphorescent materials, thermochromic materials and polarizing materials have characteristic half-lives which determine the time taken for a mark to fade. The receiving medium 413 may be selected with a half-life suitable to allow the tracing apparatus 400 to self erase over a predetermined time period for repeated use.

Alternatively, the receiving medium 413 may include a matrix of photosensitive electronic components such as photodiodes, photovoltaic cells, photodetectors, photomultipliers, photoconductors and the like. The matrix may send electronic signals to a processor such as computer so that the path may be recorded in a memory, displayed on a visual display unit, printed out or otherwise displayed.

Thus in contradistinction to the prior art, the maintenance free tracing apparatus 400 does not require any consumerables to be replaced and does not produce the mess generated by untrained users discarding paper, pens and the like.

Although an exemplary tracing apparatus 400 for use in science centers is described above it will be apparent that other devices may incorporate various embodiments of the invention. For example, self erasing papers for use with toys, pens configured only to write on specific surfaces and the like.

Figure 5:
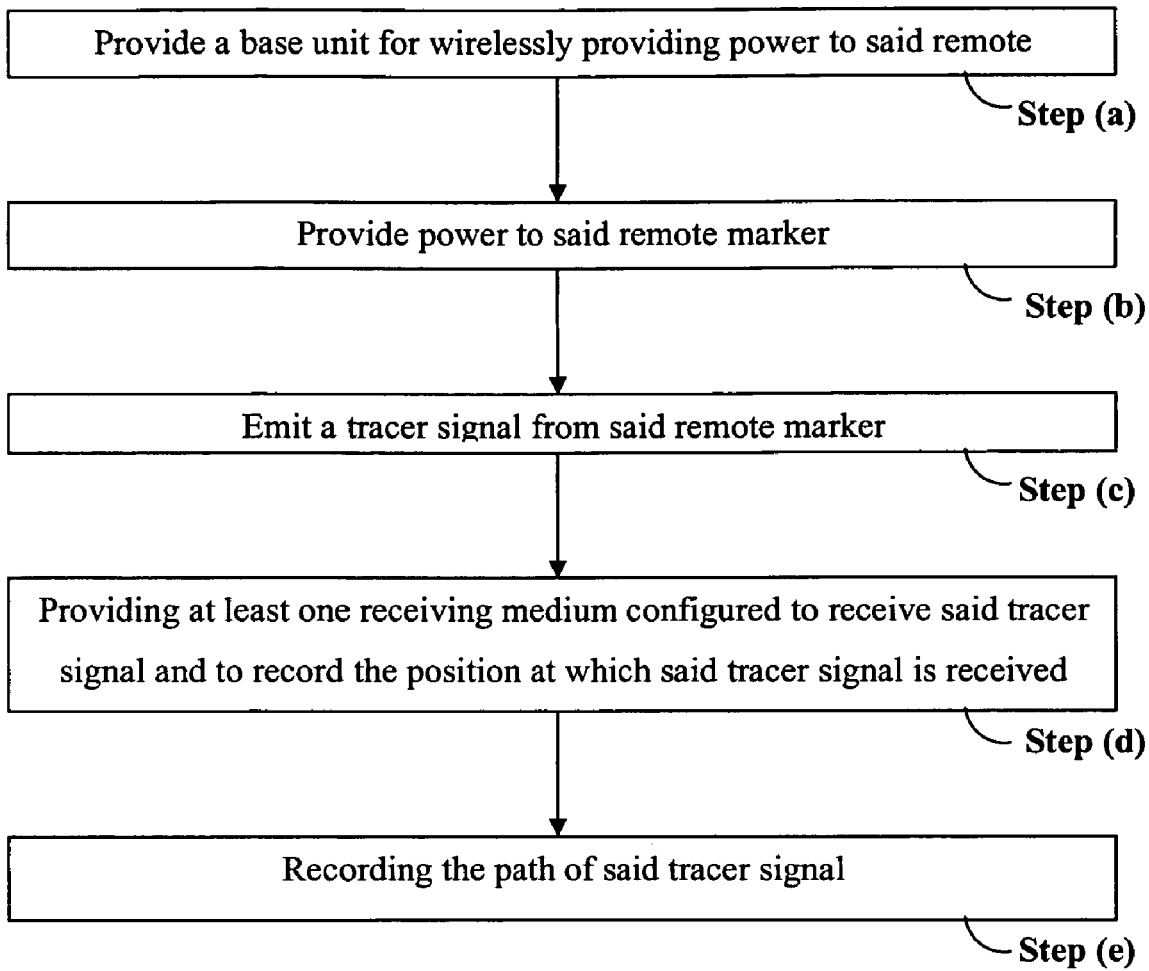
FIG. 5 is a flowchart representing a method for tracing the trajectory of a remote marker according to a further embodiment of the present invention.

FIG. 5 is a flowchart representing a method for tracing the trajectory of a remote marker using a tracing apparatus according to a further embodiment of the invention. The method includes the following stages: providing a base unit for wirelessly providing power to said remote marker—Step (a); providing power to said remote marker—Step (b); emitting a tracer signal from said remote marker—Step (c); providing at least one receiving medium configured to receive said tracer signal and to record the position at which said tracer signal is received—Step (d); and recording the path of said tracer signal—Step (e).

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A trajectory tracing system, configured to trace a trajectory traveled by at least one marker, said system comprising:
   a. at least one remote marker unit configured to leave a recordable trace, said marker unit comprising an emitter configured to emit a tracer signal;
   b. at least one receiving medium configured to receive said tracer signal and to record said recordable trace; and
   c. at least one power providing arrangement comprising a base unit configured to provide power wirelessly to said emitter.

2. The system of claim 1 wherein said emitter is configured to emit electromagnetic radiation.

3. The system of claim 2 wherein said emitter emits radiation selected from the group consisting of: visible light, infrared, ultraviolet and radio waves.

4. The system of claim 1 wherein said receiving medium comprises a photosensitive material.

5. The system of claim 4 wherein said photosensitive material is selected from the group consisting of: photochromic materials, photoluminescent materials, phosphorescent materials, thermochromic materials and polarizing materials.

6. The system of claim 4 wherein said photosensitive material comprises a matrix of photosensitive electronic components selected from the group consisting of: photodiodes, photovoltaic cells, photodetectors, photomultipliers and photoconductors.

7. The system of claim 4 wherein said photosensitive material comprises a reversible photosensitive material whose appearance returns to its original state after a time delay.

8. The system of claim 1 wherein said base unit comprises a primary inductive coil and said remote marker unit comprises a secondary inductive coil configured to couple inductively with said primary inductive coil.

9. The system of claim 1 wherein said base unit comprises a light source and said remote marker comprises at least one photovoltaic cell.

10. The system of claim 1 wherein said base unit comprises a high energy radio transmitter and said remote marker comprises an antenna tuned to receive a signal from said high energy radio transmitter.

11. The system of claim 1 wherein said base unit of said power providing arrangement comprises a high energy ultrasonic transmitter and said remote marker comprises a piezoelectric device for receiving a signal from said high energy ultrasonic transmitter.

12. The system of claim 1 comprising an apparatus selected from a group consisting of a scientific demonstration apparatus, an exhibit in an interactive science center, a toy and a writing apparatus.

13. A remote marker unit comprising said emitter configured to receive power wirelessly from said base unit of the system of claim 1.

14. A base unit comprising said receiving medium of the system of claim 1.

15. A method for tracing the trajectory of a remote marker comprising:
   a. providing a base unit for wirelessly providing power to said remote marker;
   b. providing power to said remote marker;
   c. emitting a tracer signal from said remote marker;
   d. recording the position at which said tracer signal is received by a receiving medium; and
   e. recording the path of said tracer signal.

* * * * *